Sept. 13, 1960  F. P. WARRICK  2,952,183
HIGH-SPEED CAMERA
Filed Dec. 7, 1956  6 Sheets-Sheet 1
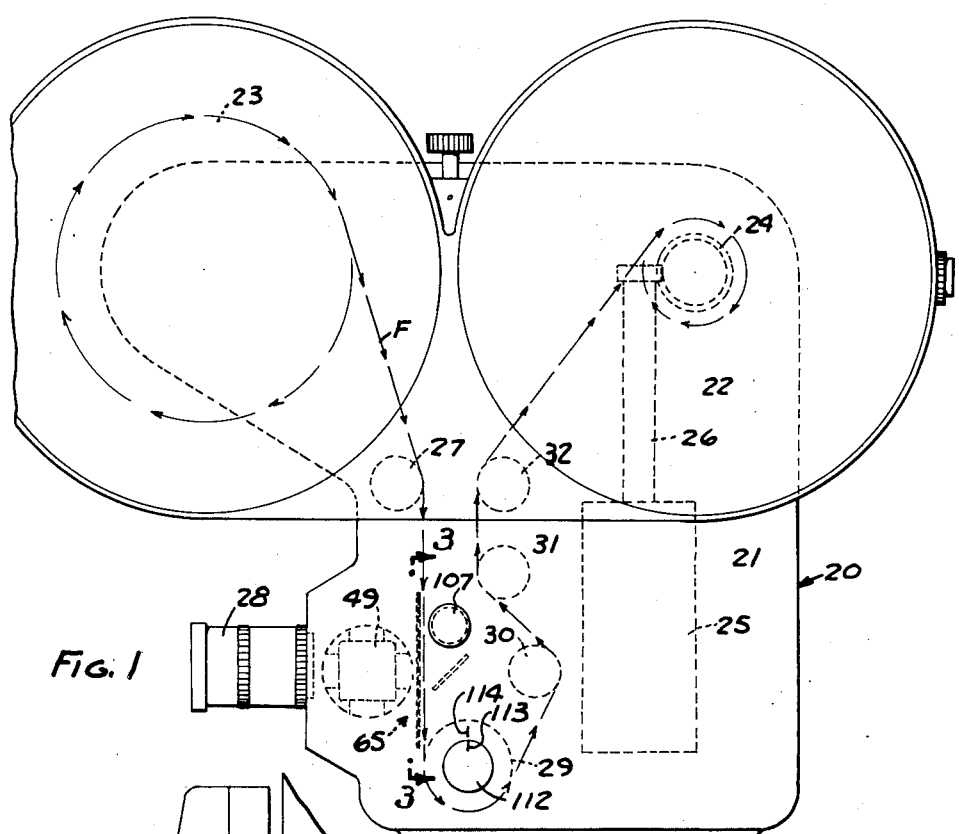
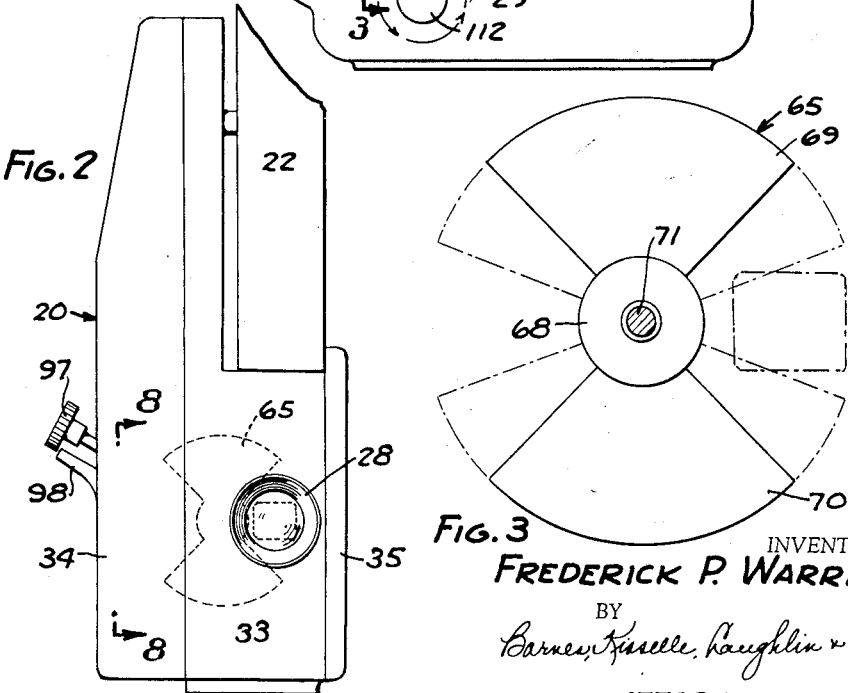
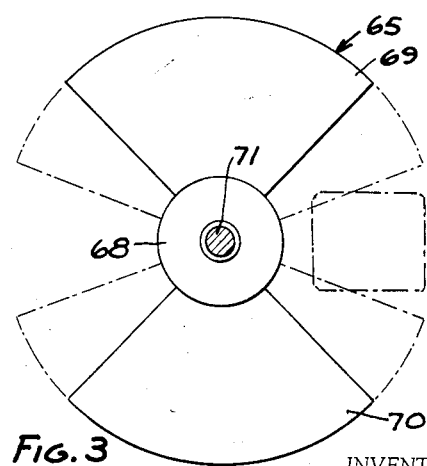
INVENTOR.
FREDERICK P. WARRICK
BY
Barnes, Kisselle, Laughlin & Raisch
ATTORNEYS INVENTOR.
FREDERICK P. WARRICK
BY
Barnes, Kisselle, Laughlin & Raisch
ATTORNEYS INVENTOR.
FREDERICK P. WARRICK
BY
Barnes, Kisselle, Laughlin & Raisch
ATTORNEYS Sept. 13, 1960 F. P. WARRICK 2,952,183
HIGH-SPEED CAMERA
Filed Dec. 7, 1956 6 Sheets-Sheet 4

INVENTOR.
FREDERICK P. WARRICK
BY
Barnes, Kisselle, Laughlin & Raisc
ATTORNEYS

Sept. 13, 1960  F. P. WARRICK  2,952,183
HIGH-SPEED CAMERA
Filed Dec. 7, 1956  6 Sheets-Sheet 6

INVENTOR.
FREDERICK P. WARRICK
BY
ATTORNEYS

United States Patent Office 2,952,183
Patented Sept. 13, 1960

2,952,183
HIGH-SPEED CAMERA
Frederick P. Warrick, 8565 Thendara, Clarkston, Mich.

Filed Dec. 7, 1956, Ser. No. 627,012

9 Claims. (Cl. 88—16.8)

This invention relates to high-speed photographic cameras and particularly to cameras which are adapted to make a succession of photographs of rapidly moving objects such as aircraft, missiles and the like.

Because of the high speed of moving objects such as jet aircraft and guided missiles, it has become impossible to use motion-picture cameras wherein the film is fed intermittently. Accordingly, at the present time, cameras are in use wherein the film is moved continuously through the camera past a photographic lens. The individual frames or exposures are obtained by positioning a polygonal prism between the lens and the film with the axis of the prism perpendicular to the axis of the camera lens and parallel to the plane of the film at the exposure area.

The prism is mounted in a cage, portions of which overlie the corners or areas of juncture of the prism faces. The prism is rotated about its axis in timed relationship to the movement of the film and, as the prism rotates, the image formed by the lens is displaced and moves along with the film. Because the prism rotates about its axis, the cage portions which overlie the corners of the prism serve as a shutter to cut off the passage of the image through the prism. As successive faces of the prism pass between the lens and the film, a multiplicity of images is produced in succession on the moving film.

Such cameras utilizing 16 mm. film have been used with some success. However, technicians and scientists who analyze rapidly moving objects have found it more accurate and convenient to utilize 35 mm. film or larger film formats with full frame images. When 35 mm. film is used in a camera incorporating the above construction, the resultant image on the film is often blurred and there is a failure to produce images corresponding to those which the lens is capable of resolving. This has resulted in the almost universal use of 16 mm. film as contrasted to the more desirable 35 mm. film.

Another disadvantage of such cameras has been that, in order to increase the ability of the camera to stop the action of a more rapidly moving object, the film must be fed through the camera at a greater rate. This results in a waste of film especially where the ultimate purpose of the use of a camera is to produce a series of successive images and not necessarily follow the entire trajectory or path of the moving object.

Another disadvantage of such cameras has been that the image is distorted because the film is moved past the exposure area in a curved path while the lens of the camera is focused so that the image is in proper focus on a flat plane.

A further disadvantage of such cameras using prisms is that the displacement of the image relative to the moving film is such that at first the image lags behind the film and later advances ahead of the film as the angle of rotation of the prism increases. This causes the image which is projected against the film to be more blurred at the edges of the frame than near the center of the frame.

It is therefore an object of this invention to provide a high-speed photographic camera which has high resolving power.

It is a further object of this invention to provide such a camera wherein the image is resolved to substantially the same extent throughout the entire area of the frame.

It is a further object of this invention to provide such a camera which may utilize 35 mm. film or larger film.

It is a further object of this invention to provide such a camera wherein the motion-stopping ability thereof may be controlled without increasing the speed of movement of the film therethrough.

It is a further object of this invention to provide such a camera which will utilize 35 mm. film and produce full frame images at the rate of at least 2,000 images per second.

It is a further object of this invention to provide such a camera which will utilize 35 mm. film and produce a full frame image wherein 40 to 56 lines per millimeter may be readily discerned when the camera is tested in accordance with the National Bureau of Standards Test Chart.

In the drawings:

Fig. 1 is a fragmentary side elevational view of a camera embodying the invention, parts being shown in dotted lines.

Fig. 2 is a front elevational view of the camera embodying the invention.

Fig. 3 is a fragmentary sectional view taken along the line 3—3 in Fig. 1, parts being shown in dotted lines.

Figure 4:
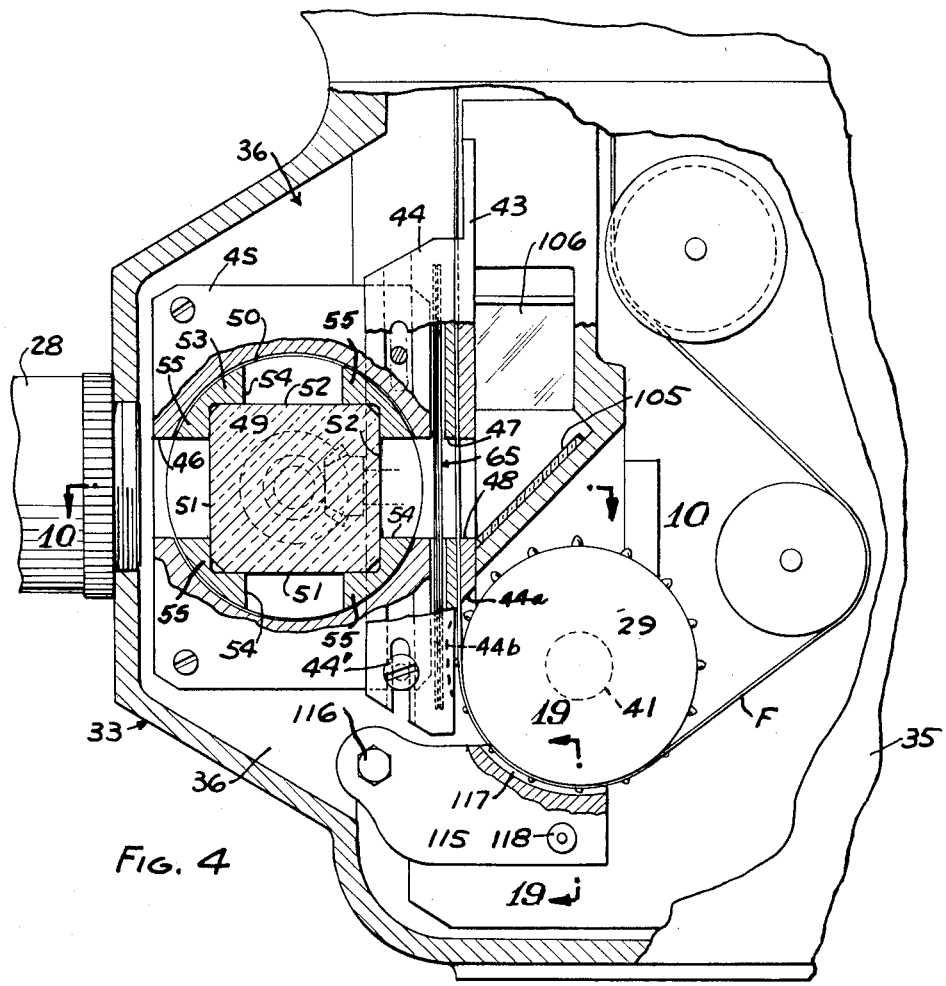
Fig. 4 is a fragmentary part sectional view of a portion of the camera shown in Fig. 1 on a greatly enlarged scale.

Referring to Fig. 1, camera 20 comprises a housing 21 on which a reel magazine 22 is removably mounted. Reel magazine 22 has rotatably mounted therein a supply reel 23 of photographic film and a take-up or drive reel 24 for the film. Drive reel 24 is driven by an electric motor 25 mounted in housing 21 and having a driven connection generally designated as 26 to drive reel 24. As shown in Fig. 1, film F passes downwardly from supply reel 23, over idler 27 and then in a flat vertical plane which is perpendicular to the axis of lens 28 mounted in the front of housing 21. The film then passes over a governor sprocket 29 and additional idler rolls 30, 31 and 32 to drive reel 24.

The film is pulled continuously through the camera by drive reel 24, the full cross sectional strength of film F being used to obtain movement and quick starting of the camera. Governor sprocket 29 controls the operation of motor 25 to insure the constant rate of movement of the film through the camera. The details of construction of the film drive are more clearly shown and described in my Patent No. 2,629,646, titled "Shutterless Recording Oscillographic Camera," issued February 24, 1953, and my pending application Serial No. 333,638, titled "High Speed Strip Recording Means for Transient Phenomena," filed January 28, 1953, issued as Patent No. 2,910,340 on October 27, 1959.

Figure 9:
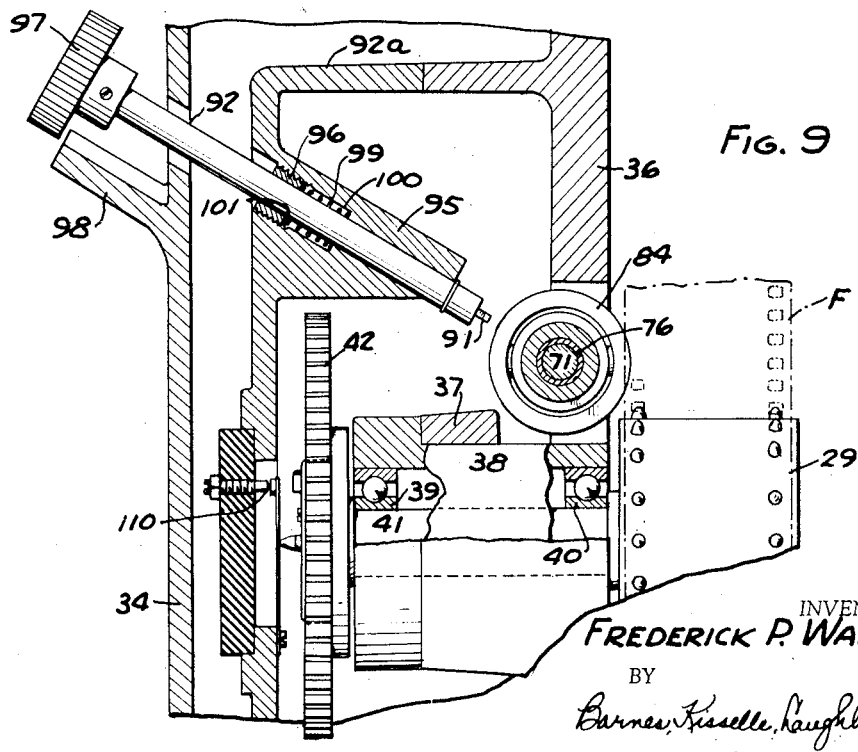
Fig. 9 is a fragmentary sectional view taken along the line 9—9 in Fig. 8.

As shown in Figs. 2, 4, 9 and 10, housing 21 comprises a hollow casting or body 33 and side covers 34, 35. As shown in Fig. 9, body 33 includes a centrally disposed, vertical wall 36 in which governor sprocket 29 is journalled. Specifically, wall 36 is provided with a hub 37 in which a sleeve 38 is positioned to support spaced bearings 39, 40. Governor sprocket 29 is mounted at one end of shaft 41 which is mounted in bearings 39, 40. A gear 42 is mounted on the other end of shaft 41 and provides a drive for a prism and shutter as presently described. Governor sprocket 29 encloses a governor mechanism which engages and disengages an electrical contact 110 which, in turn, actuates a control mechanism for controlling the speed with which the film is pulled through the camera. Such a speed-control mechanism is shown and described in my Patent No. 2,643,871, titled "Magnetically Biased Centrifugal Speed Sensing Means," issued June 30, 1953.

Figure 10:
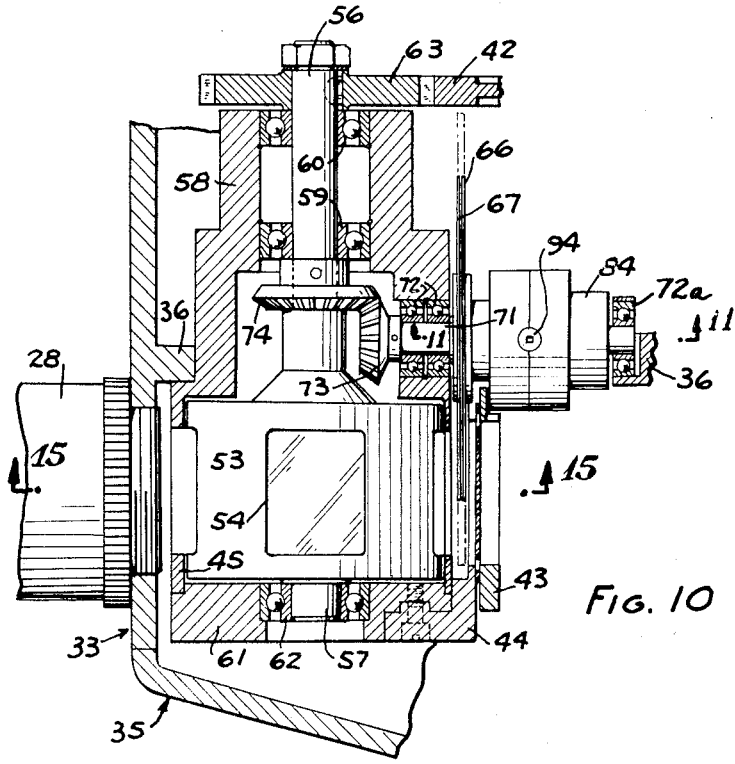
Fig. 10 is a fragmentary sectional view taken along the line 10—10 in Fig. 4, parts being broken away.

Referring to Figs. 4 and 10, wall 36 of body 33 is provided with a vertically extending, transverse wall 43 along which film F moves downwardly. A vertical guide member 44 cooperates with transverse wall 43 to guide the film downwardly and maintain it flat. As shown in Fig. 4, a generally rectangular prism housing 45 is mounted by bolts on body 33. A rectangular aperture 46 is provided in housing 45 with the axis thereof in alignment with the axis of lens 28. In addition, transverse wall 43 and aligning member 44 are provided with rectangular apertures 47, 48, respectively, in alignment with aperture 46 in housing 45. Vertical guide member 44 is mounted on prism housing 45 and is maintained in position by bolts 44' extending through slots in vertical guide member 44 and into the prism block. Bolts 44' are loosened and guide member 44 is moved upwardly to permit the film to be threaded around sprocket 29. A block 115 is pivoted on wall 36 by means of a bolt 116 and is provided with a curved surface 117 which assists in maintaining the film in threaded position on sprocket 29. Surface 117 is provided with grooves 42a to permit free movement of the teeth on sprocket 29. Guide member 44 also contains slots 44b to provide clearance for the teeth of sprocket 29 when member 44 is in downward position. Block 115 is maintained in proper position by a bolt 118 threaded into transverse wall 36. When the film is being loaded bolt 118 is loosened and the block is permitted to pivot downwardly about bolt 116 in order to provide clearance for threading the film.

A polygonal prism 49 herein shown as cubical is mounted in a cage 53 mounted for rotation in a cylindrical cut-away portion 50 of housing 45 for rotation about its axis with its axis perpendicular to the axis of lens 28, parallel to the plane of movement of the film and perpendicular to the line of movement of the film. Prism 49 being cubical provides two pairs of parallel, spaced faces 51, 52. Cage 53 which is generally cylindrical and is provided with a plurality of rectangular openings 54 in the cylindrical side wall thereof. Prism 49 is mounted within the cage so that the axes of openings 54 are perpendicular to the faces 51, 52 and solid portions 55 of the cage overlie the corners of the prism where faces 51, 52 intersect.

As shown in Fig. 10, cage 53 is supported by a pair of aligned shafts 56, 57. Shaft 56 is journalled in a hub 58 extending from block 45 by spaced ball bearings 59, 60. Shaft 57 is journalled in a cap plate 61 mounted on housing 45 and supporting a ball bearing 62 in which shaft 57 is journalled. A gear 63 is keyed to the end of shaft 56 and meshes with gear 42 on shaft 41 of the governor sprocket 29 so that cage 53 and, in turn, prism 49 are rotated in synchronism with governor sprocket 29. Since governor sprocket 29 is rotated by the passage of film thereover, prism 49 is rotated in synchronism or timed relationship to the movement of the film through the camera.

Figure 5:
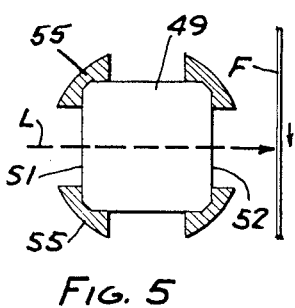
Figs. 5, 6 and 7 are diagrammatic views illustrating the passage of light through a portion of the camera.
Figure 6:
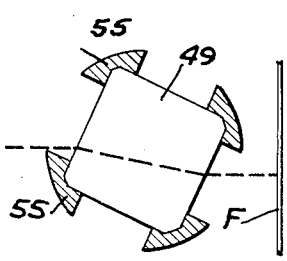
Figure 7:
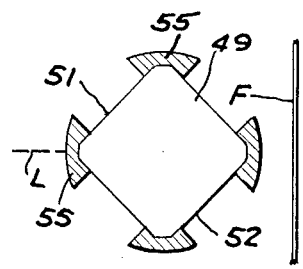
Figure 8:
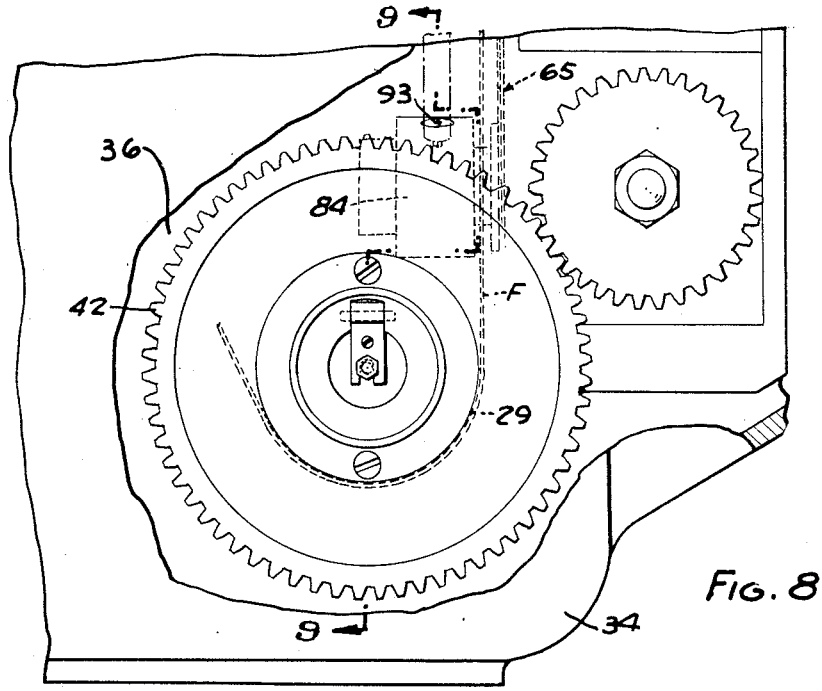
Fig. 8 is a fragmentary sectional view of a portion of the camera taken along the line 8—8 in Fig. 2, parts being broken away.

Referring to Figs. 5, 6 and 7, the rotation of prism 49 causes an image represented by a light ray L to be displaced and moved along the exposure plane so that there is substantially no relative movement between the image and the film. The light passes through the first face 51, is refracted to the second face 52 and then is refracted toward the film F. The rotation of the prism 49 is timed with the movement of the film so that the image which is directed against the vertical plane of exposure along which the film moves also moves at the same speed as the film.

As the prism continues to rotate, a solid portion 55 of cage 53 cuts off the passage of light through the prism until the prism rotates to a point where the light can again enter the prism through a succeeding face.

Referring to Fig. 1, according to the invention, a shutter assembly 65 is positioned between the prism 49 and the film F and is operated in a manner and by a mechanism presently described in timed relationship to the rotation of the prism and the movement of the film to cut off the passage of the image from the prism to the film before the solid portions 55 of the cage have had an opportunity to cut off the passage of the image to the film (Fig. 7).

Figure 11:
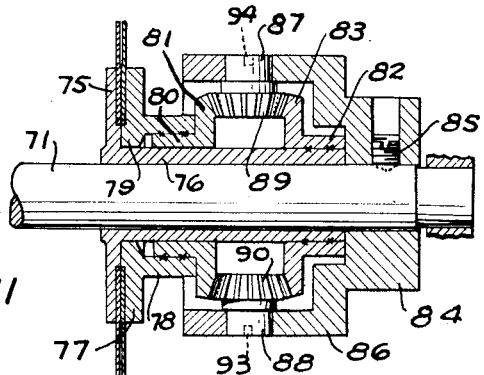
Fig. 11 is a fragmentary sectional view taken along the line 11—11 in Fig. 10.

As shown in Fig. 11, shutter assembly 65 comprises a pair of disc-like shutters 66, 67. Each shutter comprises a central, annular portion 68 and a pair of diametrically opposed sectors 69, 70 extending radially from central portion 68 (Fig. 3). The shutters are mounted for rotation about a common axis so that in one revolution of the shutters light is permitted to pass therethrough, twice. The shutters rotate in fixed relationship to each other. The relative angular positions of the two shutters 66, 67 may be adjusted to vary the size of the opening through which the light passes. As shown in solid lines in Fig. 3, the shutters are in registering relationship and the openings for the passage of light are large. However, the shutters may be moved relative to each other to make the openings smaller, thereby reducing the exposure time as shown in the dotted line positions in Fig. 3. The angular extent of each sector 69, 70 is 90° plus an amount sufficient to permit the sectors to overlap even when the sectors have been moved angularly relative to each other to such an extent that the shutter opening is completely eliminated.

Referring to Figs. 10 and 11, the structure for mounting shutters 66, 67 includes a shaft 71 which is journalled for rotation in hub 58 by ball bearings 72 with the axis thereof at right angles to the axis of shafts 56, 57 which support cage 53. Ball bearing 72a journal the outer end of shaft 71 in wall 36. Suitable brackets (not shown) support bearing 72a in wall 36. A bevel gear 73 is mounted on one end of shaft 71 and meshes with a bevel gear 74 on shaft 56 so that shaft 71 is rotated in timed relationship to the rotation of shaft 56 and, in turn, of prism 49.

As shown in Fig. 11, shutter 67 is fixed on a flange 75 extending radially outwardly from a sleeve 76 which is rotatably mounted on shaft 71. Shutter 66 is similarly mounted on a flange 77 extending radially from collar 78 which has a portion 79 thereof rotatably mounted on sleeve 76. A hub 80 of a bevel gear 81 is inserted within collar 78 and surrounds sleeve 76. Hub 80 is soldered to collar 78. Hub 82 of another bevel gear 83 surrounds and is soldered to sleeve 76 in spaced relationship to gear 81 with the teeth of gear 81 facing the teeth of gear 83.

A cylindrical differential carrier 84 is fastened to the other end of shaft 71 by a set screw 85 and includes a peripheral skirt 86 surrounding gears 81, 83. Diametrically opposed hubs 87, 88 of bevel gears 89, 90 are rotatably mounted in skirt 86 and with gears 89, 90 extending radially inwardly toward shaft 71 into mesh with bevel gears 81, 83. In order to facilitate assembly, skirt 86 is split in a plane through the axes of bevel gears 89, 90. In normal operation, the rotation of shaft 71 carries differential carrier 84 and bevel gears 81, 83 around the axis of shaft 71 without any relative movement, thereby moving shutters 66, 67 around the axis of shaft 71 without changing their relative relationship.

When it is desired to change the angular position of one shutter relative to the other, either gear 89 or gear 90 may be rotated, thereby displacing bevel gears 81, 83 angularly relative to each other and, in turn, displacing sleeve 76 and collar 78 on which shutters 66, 67 are mounted. By moving both shutters 66, 67 simultaneously by means of the differential mechanism, the centrality of the shutter opening relative to prism faces 51, 52 and the axis of lens 28 is maintained.

Referring to Fig. 9, the mechanism for adjusting the size of the shutter may comprise a small, non-circular pin 91 mounted on the end of a shaft 92 which is adapted to be moved inwardly to engage correspondingly-shaped openings 93, 94 in hubs 88, 87, respectively (Fig. 11). Shaft 92 is supported in a portion 95 forming a part of cover 92a on wall 36 and projects outwardly to the exterior of the camera. An operating knob 97 is mounted on the end of shaft 92 and a fixed scale 98 is provided in association with knob 97 in order that the angular position of the shutters and, in turn, the exposure time, may be accurately adjusted by turning knob 97 a predetermined amount as shown on scale 98. Scale 98 may bear suitably calibrated scribe marks (not shown). Shaft 92 and, in turn, operating pin 91 is normally kept out of engagement with openings 93 by a helical spring 99 positioned in a cavity 100 and compressed between the base of cavity 100 and a washer 101 mounted on shaft 92, thereby urging shaft 92 yieldingly outwardly. Nut 96 threaded in portion 95 maintains shaft 92 in position.

In order to insure that one of the openings 93, 94 in hubs 87, 88 will be in alignment with pin 91 on shaft 92 when an adjustment in shutter opening is to be made, the adjusting knob 112 on the end of sprocket 29 is provided with a scribe mark 113 which is brought into alignment with a scribe mark 114 on cover 35 (Fig. 1) to indicate that one of the openings 93, 94 is in alignment with the axis of pin 91.

Referring to Figs. 1 and 4, the camera may be provided with suitable focusing mechanism including mirrors 105, 106 which project an image from the exposure plane through an opening in the side of cover 35 of camera housing 21 which is normally covered by a cap 107. Cap 107 may be removed and a microscope (not shown) positioned in the opening to observe an image for focusing. The focusing image may be obtained by removing cover 35 and placing a piece of focusing film, commonly known as ground film, adjacent windows 47, 48.

Figure 15:
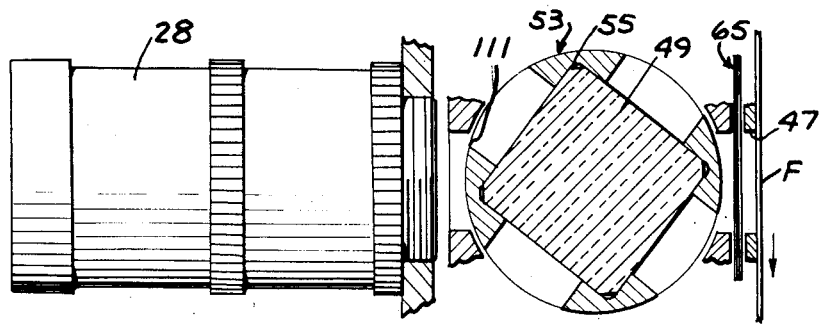
Fig. 15 is a sectional view taken along the line 15—15 in Fig. 10.

The operation of the camera may be more readily understood by referring to Figs. 12 through 15, inclusive. As shown in Fig. 15, the film F is fed downwardly past the aperture 47. At the same time, prism 49 is caused to rotate about its axis at a speed which is synchronized with the downward movement of the film. The shutter is rotated about its axis so that the shutter opening is successively moved past the exposure area to successively expose portions of the film. Since the prism 49 produces four images or frames in one revolution and the shutter produces two exposures in one revolution, the shutter must rotate at such a rate that it makes two revolutions for each revolution of the prism. In order to simplify the operation of the mechanism, it has been found most satisfactory to rotate the shutter so that it is moving upwardly relative to the film in the area adjacent the film. Otherwise, the shutter would have to move much more rapidly in order to obtain the same number of exposures in any unit length of film.

Figure 12:
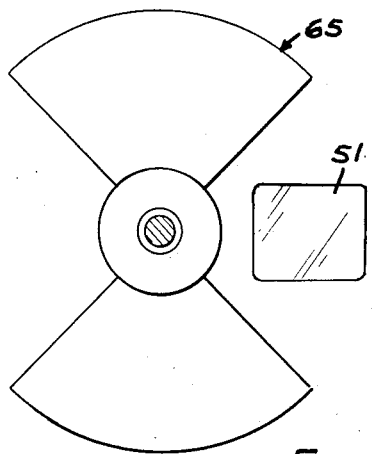
Figs. 12, 13 and 14 are partially diagrammatic views showing the relative positions of the prism and shutter of the camera in various stages during the exposure of a single frame of film.
Figure 13:
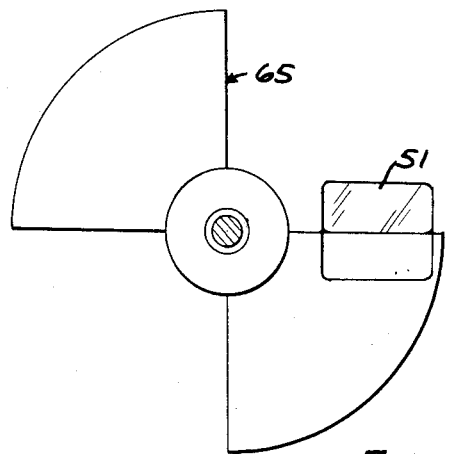
Figure 14:
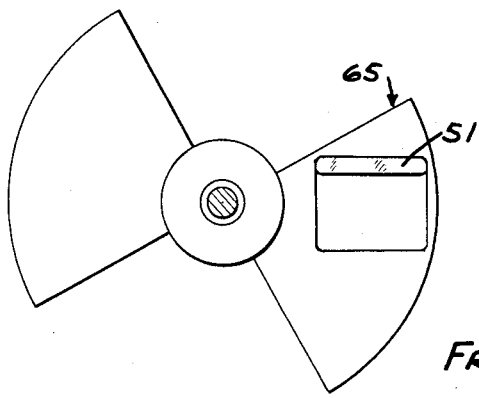

As shown in Fig. 12, the shutter opening is adjacent the exposure area, thereby permitting the passage of light and the formation of an image on the film. As the shutter rotates, the prism 49 also rotates, causing the image to move together with the film in the exposure plane. The shutter opening then begins to move past the exposure area, as shown in Fig. 13, and the shutter begins to cut off the passage of the image to the film. Finally, the shutter opening moves completely past the exposure area and the shutter fully cuts off the image to the film, even though the image is still transmitted through the prism shown by the exposed portion of face 51 of the prism shown in Fig. 14. It should be understood that the rotation of the prism and operation of the shutter are extremely fast so that the operation shown and described with reference to Figs. 12, 13 and 14 is intended to show instantaneous relationships. As the shutter and prism continue to rotate, the solid portion 55 of the prism cage cuts off the image and prevents the passage thereof through prism 49, but this has no effect upon the exposure of the film since the shutter has already closed.

Figure 16:
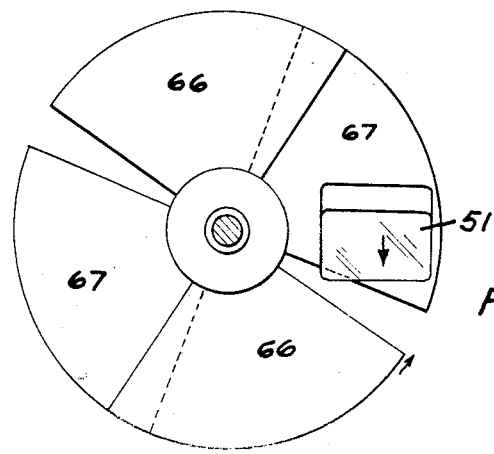
Figs. 16, 17 and 18 are partially diagrammatic views similar to Figs. 12, 13 and 14 with the shutter adjusted to a smaller aperture.
Figure 19:
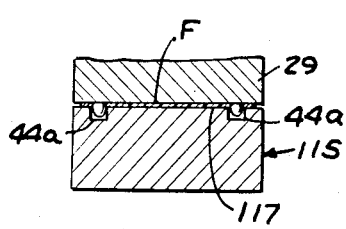
Fig. 19 is a fragmentary sectional view taken along the line 19—19 in Fig. 4.
Figure 17:
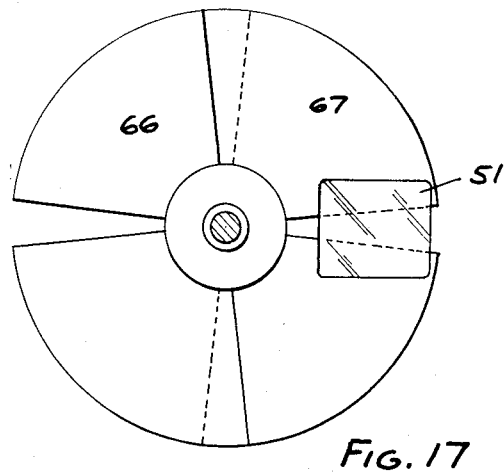
Figure 18:
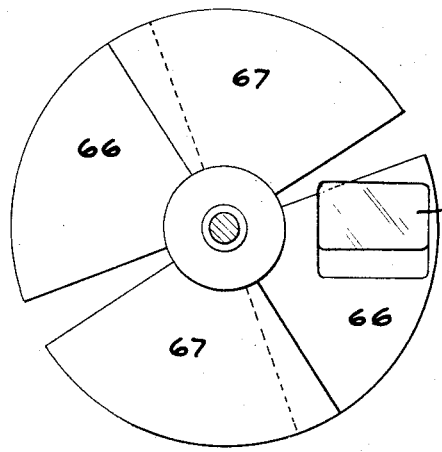

The operation of the camera when the shutter opening is made smaller may be more readily understood by referring to Figs. 16 through 18, inclusive. As shown in Fig. 16, when the shutter opening is small, that is, smaller in angular extent that the height of the image, the movement of the shutter opening past the exposure area causes successive portions of the image to be transmitted to the film. As the shutter opening finally moves completely past the exposure area, the shutter cuts off the passage of the image to the film, even though the image is still transmitted through the prism, as shown by the exposed portion of face 51 of the prism in Fig. 18. As the shutter and prism continue to rotate, solid portion 55 of the prism cage prevents the passage of the image through prism 49; but this has no effect upon the exposure of the film, since the shutter opening has already passed the exposure area. The resultant image is of the same frame height as when the shutter opening is larger, since the shutter opening provides an integrating effect by exposing successive portions of the image.

Although I do not wish to be bound by the theory involved, in my opinion, when the edges 111 of solid portions 55 begin to cut off the passage of the image from the lens, a diffraction of the image is produced causing a blurring of the image. The use of a shutter between the prism and film cuts off the passage of the image to the film before the solid portions 55 begin to cut off the passage of the image and thereby prevents this diffraction with the resultant image blurring. In addition, by moving the film through the exposure area in a flat plane an out of focus condition which would normally be caused by moving the film through a curved plane is eliminated. When the shutter opening is less in angular extent than the height of the image frame, the prism compensation error due to the rotation of the prism in causing the image to lag and lead relative to the film cannot cause loss of resolution.

By utilizing the construction shown herein, I have satisfactorily operated a camera utilizing 35 mm. film at rates exceeding 2,000 frames per second. Moreover, I have been able to obtain full frame images of 0.750 inch in height wherein 40 to 56 lines per millimeter may be resolved in accordance with the National Bureau of Standards Test Chart at any point on the image.

Inasmuch as the size of the openings of the shutter may be readily adjusted, it is possible, by making these openings small, to obtain high motion-stopping ability in the camera without increasing the rate of movement of the film through the camera.

I claim:

1. In a high-speed motion picture camera, the combination comprising means forming a fixed aperture which defines an exposure area, means for continuously moving a strip of film past said aperture, a solid prism for causing successive images to be directed toward said exposure area and moved along with said film at substantially the same rate as the film, said solid prism comprising at least one pair of spaced parallel surfaces mounted for rotation about an axis perpendicular to the direction of movement of the film past said aperture, means for directing an image through said prism, means for rotating said prism to cause successive images to be directed through the aperture onto the film and cause the images to move with the film, a shutter having a portion thereof movable into the path of the images between said prism and said aperture, said shutter having at least one opening therein which is movable across said aperture in a direction generally parallel to the direction of movement of the film, said shutter opening having an effective height as it moves across the aperture which is less than the height of the aperture and an effective width as it moves across the aperture which is at least as great as the width of the aperture, means for operating said shutter in timed relationship to said prism and the movement of the film so that a shutter opening moves across the aperture once for each surface of each pair of prism surfaces, said latter means moving said shutter at a speed such that said opening moves relative to the film as said opening is moved across the aperture, said shutter opening being substantially centered when the corresponding surface on said prism is substantially normal to the optic axis of the camera, such that progressive portions of each image are transmitted onto said film and integrated to form a single image.

2. In a high-speed motion picture camera, the combination comprising means forming a fixed aperture which defines an exposure area, means for continuously moving a strip of film past said aperture, a solid prism for causing successive images to be directed toward said exposure area and moved along with said film at substantially the same rate as the film, said prism comprising at least one pair of spaced parallel surfaces mounted for rotation about an axis perpendicular to the direction of movement of the film past said aperture, means for directing an image through said prism, means for rotating said prism to cause successive images to be directed through the aperture onto the film and cause the images to move with the film, a shutter having a portion thereof movable into the path of the images between said prism and said aperture, said shutter having at least one opening therein which is movable across said aperture in a direction generally parallel to and in the same direction as the direction of movement of the film, said shutter opening having an effective height as it moves across the aperture which is less than the height of the aperture and an effective width as it moves across the aperture which is at least as great as the width of the aperture, means for operating said shutter in timed relationship to said prism and the movement of the film so that a shutter opening moves across the aperture once for each surface of each pair of prism surfaces, said latter means moving said shutter at a speed such that said opening moves relative to the film as said opening is moved across the aperture, said shutter opening being substantially centered when the corresponding surface on said prism is substantially normal to the optic axis of the camera, such that progressive portions of each image are transmitted onto said film and integrated to form a single image.

3. In a high-speed motion picture camera, the combination comprising means forming a fixed aperture which defines an exposure area, means for continuously moving a strip of film past said aperture, a solid prism for causing successive images to be directed toward said exposure area and moved along with said film at substantially the same rate as the film, said prism comprising at least one pair of spaced parallel surfaces mounted for rotation about an axis perpendicular to the direction of movement of the film past said aperture, means for directing an image through said prism, means for rotating said prism to cause successive images to be directed through the aperture onto the film and cause the images to move with the film, a shutter having a portion thereof movable into the path of the images between said prism and said aperture, said shutter having at least one opening therein which is movable across said aperture in a direction generally parallel to and in the opposite direction as the direction of movement of the film, said shutter opening having an effective height as it moves across the aperture which is less than the height of the aperture and an effective width as it moves across the aperture which is at least as great as the width of the aperture, means for operating said shutter in timed relationship to said prism and the movement of the film so that a shutter opening moves across the aperture once for each surface of each pair of prism surfaces, said latter means moving said shutter at a speed such that said opening moves relative to the film as said opening is moved across the aperture, said shutter opening being substantially centered when the corresponding surface on said prism is substantially normal to the optic axis of the camera, such that progressive portions of each image are transmitted onto said film and integrated to form a single image.

4. In a high-speed motion picture camera, the combination comprising means forming a fixed aperture which defines an exposure area, means for continuously moving a strip of film past said aperture, a solid polygonal prism having a plurality of pairs of spaced parallel surfaces mounted adjacent said aperture for rotation about an axis parallel to the plane of said aperture and perpendicular to the direction of movement of said film past said exposure area, means for directing an image through said prism, means for rotating said prism to cause successive images to be directed through the aperture onto the film and cause the images to move with the film at substantially the same rate as the film, a shutter having a portion thereof movable into the path of the images between said prism and said aperture, said shutter having at least one opening therein which is movable across said aperture in a direction generally parallel to the direction of movement of the film, said shutter opening having an effective height as it moves across the aperture which is less than the height of the aperture and an effective width as it moves across the aperture which is at least as great as the width of the aperture, means for operating said shutter in timed relationship to said prism and the movement of the film so that a shutter opening moves across the aperture once for each surface of each pair of prism surfaces, said latter means moving said shutter at a speed such that said shutter opening moves relative to the film as said shutter opening is moved across the aperture, said shutter opening being substantially centered when the corresponding surface on said prism is substantially normal to the optic axis of the camera, such that progressive portions of each image are transmitted onto said film and integrated to form a single image.

5. In a high-speed motion picture camera, the combination comprising means forming a fixed aperture which defines an exposure area, means for continuously moving a strip of film past said aperture, a solid polygonal prism having a plurality of pairs of spaced parallel surfaces mounted adjacent said aperture for rotation about an axis parallel to the plane of said aperture and perpendicular to the direction of movement of said film past said exposure area, means for directing an image through said prism, means for rotating said prism to cause successive images to be directed through the aperture onto the film and cause the images to move with the film at substantailly the same rate as the film, a disc shutter, means for mounting said shutter for rotation, the axis of rotation of said shutter being spaced from the optic axis of said aperture and lying in substantially the same horizontal plane as the center of said aperture, said shutter having at least one opening therein which is movable between said prism and said aperture across said aperture in a direction generally parallel to the direction of movement of the film, said shutter opening having an effective height as it moves across the aperture which is less than the height of the aperture and an effective width as it moves across the aperture which is at least as great as the width of the aperture, means for operating said shutter in timed relationship to said prism and the movement of the film so that a shutter opening moves across the aperture once for each surface of each pair of prism surfaces, said latter means moving said shutter at a speed such that said opening moves relative to the film as said opening is moved across the aperture, said shutter opening being substantially centered when the corresponding surface on said prism is substantially normal to the optic axis of the camera, such that progressive portions of each image are transmitted onto said film and integrated to form a single image.

6. In a high-speed motion picture camera, the combination comprising means forming a fixed aperture which defines an exposure area, means for continuously moving a strip of film past said aperture, a solid prism having at least one pair of spaced parallel surfaces mounted adjacent said aperture for rotation about an axis parallel to the plane of said aperture and perpendicular to the direction of movement of said film past said exposure area, means for directing an image through said prism, means for rotating said prism to cause successive images to be directed through the aperture onto the film and cause the images to move with the film at substantially the same rate as the film, a disc shutter, means for mounting said shutter for rotation, the axis of rotation of said shutter being spaced from the optic axis of said aperture and lying in substantially the same horizontal plane as the center of said aperture, said shutter having at least one opening therein which is movable between said prism and said aperture across said aperture in a direction generally parallel to the direction of movement of the film, said shutter opening having an effective height as it moves across the aperture which is less than the height of the aperture and an effective width as it moves across the aperture which is at least as great as the width of the aperture, means for operating said shutter in timed relationship to said prism and the movement of the film so that a shutter opening moves across the aperture once for each surface of each pair of prism surfaces, said latter means moving said shutter at a speed such that said opening moves relative to the film as said opening is moved across the aperture, said shutter opening being substantially centered when the corresponding surface on said prism is substantially normal to the optic axis of the camera, such that progressive portions of each image are transmitted onto said film and integrated to form a single image.

7. In a high-speed motion picture camera, the combination comprising means forming a fixed aperture which defines an exposure area, means for continuously moving a strip of film past said aperture in a flat plane normal to the optic axis of said aperture, a solid prism having at least one pair of spaced parallel surfaces mounted adjacent said aperture for rotation about an axis parallel to the plane of said aperture and perpendicular to the direction of movement of said film past said exposure area, means for directing an image through said prism, means for rotating said prism to cause successive images to be directed through the aperture onto the film and cause the images to move with the film at substantially the same rate as the film, a disc shutter, means for mounting said shutter for rotation about an axis spaced from the optic axis of said aperture, the axis of rotation of said shutter lying in substantially the same horizontal plane as the optic axis of said aperture, said shutter having at least one opening therein which is movable between said prism and said aperture and across said aperture in a direction generally parallel to the direction of movement of the film, said shutter opening having an effective height as it moves across the aperture which is less than the height of the aperture and an effective width as it moves across the aperture which is at least as great as the width of the aperture, means for operating said shutter in timed relationship to said prism and the movement of the film so that a shutter opening moves across the aperture once for each surface of each pair of prism surfaces, said latter means moving said shutter at a speed such that said opening moves relative to the film as said opening is moved across the aperture, said shutter opening being substantially centered when the corresponding surface on said prism is substantially normal to the optic axis of the camera, such that progressive portions of each image are transmitted onto said film and integrated to form a single image.

8. In a high-speed motion picture camera, the combination comprising means forming a fixed aperture which defines an exposure area, means for continuously moving a strip of film past said aperture in a flat plane normal to the optic axis of said aperture, a solid prism for causing successive images to be directed toward said exposure area and moved along with said film at substantially the same rate as the film, said solid prism means comprising at least one pair of spaced parallel surfaces mounted for rotation about an axis perpendicular to the direction of movement of the film past said aperture, means for directing an image through said prism, means for rotating said prism to cause successive images to be directed through the aperture onto the film and cause the images to move with the film, a shutter having a portion thereof movable into the path of the images between said prism means and said aperture, said shutter having at least one opening therein which is movable across said aperture in a direction generally parallel to the direction of movement of the film, said shutter opening having an effective height as it moves across the aperture which is less than the height of the aperture and an effective width as it moves across the aperture which is at least as great as the width of the aperture, means for operating said shutter in timed relationship to said prism and the movement of the film so that a shutter opening moves across the aperture once for each surface of each pair of prism surfaces, said latter means moving said shutter at a speed such that said opening moves relative to the film as said opening is moved across the aperture, said shutter opening being substantially centered when the corresponding surface on said prism is substantially normal to the optic axis of the camera, such that progressive portions of each image are transmitted onto said film and integrated to form a single image.

9. In a high-speed motion picture camera, the combination comprising means forming an aperture which defines an exposure area, means for continuously moving a strip of film past said aperture, a solid prism for causing successive images to be directed toward said exposure area and moved along with said film at substantially the same rate as the film, said solid prism comprising at least one pair of spaced parallel surfaces mounted for rotation about an axis perpendicular to the direction of movement of the film past said aperture, means for directing an image through said prism, means for rotating said prism to cause successive images to be directed through the aperture onto the film and cause the images to move with the film, a shutter having a portion thereof movable into the path of the images adjacent said aperture, said shutter having at least one opening therein which is movable across said aperture in a direction generally parallel to the direction of movement of the film, said shutter opening having an effective height as it moves across the aperture which is less than the height of the aperture and an effective width as it moves across the aperture which is at least as great as the width of the aperture, means for operating said shutter in timed relationship to said prism and the movement of the film so that a shutter opening moves across the aperture once for each surface of each pair of prism surfaces, said latter means moving said shutter at a speed such that said opening moves relative to the film as said opening is moved across the aperture, said shutter opening being substantially centered when the corresponding surface on said prism is substantially normal to the optic axis of the camera, such that progressive portions of each image are transmitted onto said film and integrated to form a single image.

References Cited in the file of this patent

UNITED STATES PATENTS

| | | |
|---|---|---|
| 2,008,973 | Tuttle | July 23, 1935 |
| 2,055,492 | Holst | Sept. 29, 1936 |
| 2,257,938 | Clothier | Oct. 7, 1941 |
| 2,288,079 | Fitz | June 30, 1942 |
| 2,417,076 | Hickman | Mar. 11, 1947 |
| 2,449,705 | Jones | Sept. 21, 1948 |
| 2,464,138 | Luboshez | Mar. 8, 1949 |
| 2,476,503 | Maytum | July 19, 1949 |
| 2,498,580 | Roger | Feb. 21, 1950 |
| 2,653,507 | Riles et al. | Sept. 29, 1953 |

FOREIGN PATENTS

| | | |
|---|---|---|
| 609,825 | Germany | Feb. 28, 1935 |
| 597,090 | Great Britain | Jan. 19, 1948 |
| 606,000 | Great Britain | Aug. 4, 1948 |

OTHER REFERENCES

"8000 Pictures Per Second," Smith, Howard J., Journal of Society of Motion Picture Engineers, vol. 45, No. 3, September 1945, pages 171–182.

"A Wide Angle 35 mm. High Speed Motion Picture Camera," by John H. Waddell, Journal of Society of Motion Picture Engineers, vol. 46, No. 2, February 1946, pages 87–102.